US012741891B2

(12) United States Patent
Lu et al.

(10) Patent No.: US 12,741,891 B2
(45) Date of Patent: Sep. 22, 2026

(54) APPARATUS AND METHODS FOR METHYL MERCURY DETECTION AND CAPTURE

(71) Applicant: THE REGENTS OF THE UNIVERSITY OF CALIFORNIA, Oakland, CA (US)

(72) Inventors: Jennifer Lu, Merced, CA (US); William Spaller, Merced, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 563 days.

(21) Appl. No.: 18/311,630

(22) Filed: May 3, 2023

(65) Prior Publication Data

US 2023/0382772 A1 Nov. 30, 2023

Related U.S. Application Data

(60) Provisional application No. 63/337,869, filed on May 3, 2022.

(51) Int. Cl.

| | |
|---|---|
| ***C02F 1/62*** | (2023.01) |
| ***C02F 101/20*** | (2006.01) |
| ***C02F 101/30*** | (2006.01) |
| ***C02F 103/06*** | (2006.01) |

(52) U.S. Cl.

CPC ............ *C02F 1/62* (2013.01); *C02F 2101/20* (2013.01); *C02F 2101/30* (2013.01); *C02F 2103/06* (2013.01)

(58) Field of Classification Search

CPC .... C02F 1/62; C02F 2101/20; C02F 2101/30; C02F 2103/06; C02F 1/288; C02F 1/285

See application file for complete search history.

(56) References Cited

PUBLICATIONS

He, "Advanced Adsorbents for Capture of Vapor-Phase Mercury and Other Toxic Components from Flue Gas", Doctoral Dissertation, University of Cincinnati, 2013, total 304 pages. (Year: 2013).*

Kumar, Brijesh, et al. "Tetrahydropyranyl ether (THPE) formation in hydroxyl group protection and conversion to other useful functionalities", Royal Society of Chemistry, 2014, 4, pp. 21121-21130.

Speziale, A. John, "Ethanedithiol", Organic Syntheses, vol. 30, 1950, pp. 1-4.

* cited by examiner

*Primary Examiner* — Anthony J Zimmer
*Assistant Examiner* — Abdul-Rahman Yusuf Waleed Smari
(74) *Attorney, Agent, or Firm* — O'BANION & RITCHEY LLP; John P. O'Banion

(57) ABSTRACT

Devices, systems and methods for the detection and capture of mercury and methyl-mercury from aqueous sources are provided. The devices and methods are based on a polymer platform with thiol or sulfide moieties and phenol moieties capped with an acid labile protected with an acid labile cap. Capture of the Hg or MeHg by the thiol groups releases a proton that will subsequently catalyze the cleaving of the cap that also produces a proton so that one capture event can result in a cascade of deprotonaton reactions enhancing the detection limit. The polymer in solution can be detected and quantified. The thiol binding will also permanently remove the Hg or MeHg from the solution. The platform can be adapted to a portable handheld device.

10 Claims, 4 Drawing Sheets

APPARATUS AND METHODS FOR METHYL MERCURY DETECTION AND CAPTURE

CROSS-REFERENCE TO RELATED APPLICATIONS

This application claims priority to, and the benefit of, U.S. provisional patent application Ser. No. 63/337,869 filed on May 3, 2022, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to systems and methods for environmental heavy metal detections and more particularly to devices and methods for detection and capture of mercury and methyl-mercury with a handheld device that can detect mercury concentrations of about ng/mL with high sensitivity and resolution. The device can also extract mercury or methyl mercury from aqueous sources.

2. Background

Methylmercury (MeHg) is one of the most toxic of the organic forms of mercury (Hg) for humans. It has been found that even miniscule amounts of MeHg can cause damage to the central nervous system and kidneys and is especially dangerous for fetuses and infants. Ambient MeHg is typically ingested by humans through various environmental media and foods, mainly water and the consumption of contaminated rice and fish. Consequently, there is a need for inexpensive, reliable and effective methods for detecting and removing MeHg from the environment and foods.

Because of its toxicity, many approaches have been taken to detect MeHg in the water and food supply. For example, Hg species, including inorganic and organic Hg species, can be removed by a number of methods but typically by a process of chemical precipitation. Coagulation has also been used to remove Hg, but this approach results in an appreciable amount of contaminated waste.

To improve the collection efficiency, conventional methods normally include activated carbon (one of the most common industrial adsorbents), carbon nanotubes (CNTs), and other nanostructures with functionalized Hg absorbing functional groups. These material systems have been demonstrated to be effective in the advanced treatment of Hg polluted water to some extent. However, carbon separation materials are difficult to regenerate. The leaching of nanomaterials into the water supply may also cause secondary pollution.

The chemistry of Hg offers avenues to target its surface adsorption. Hg in the +2-valence state (e.g. $Hg^{2+}$ and $CH_3Hg^+$) is a soft Lewis acid that preferentially bonds with soft Lewis bases. Thus, ligands such as sulfur-containing groups have been widely used to attract Hg. Sulfur-functionalized magnetic nanoparticles have been found to effectively sequester $Hg^{2+}$ from water. These nanoparticles are more easily collected. However, these nanoparticles have not been reported to be able to release captured Hg, for example, $CH_3Hg^+$, very effectively. Further, these magnetic nanoparticles are difficult to regenerate and the leaching of nanomaterials into water causes secondary pollution.

One common approach to removing toxins for water restoration is to add different chemicals (small molecules or polymers) into the wastewater to trap metal ions or to react with harmful organic waste. However, this approach has several disadvantages. These disadvantages often include the generation of secondary pollution by the chemical absorbers because the absorbers are hard to collect. Another disadvantage to current approaches is the inadequate removal of toxins due to poor selectivity and/or affinity of current absorbers. Poor performance may be due to low-efficiency from the lack of ability of the targets to access binding sites in a 3D porous structure.

Another significant deficiency with current absorbers is the lack of a straightforward means of regeneration. There are no means to recycle the seized metal species one at a time for future use. Current absorbers often lack mechanical integrity leading to catastrophic structural failure.

Traditional detection methods are also overly complicated and expensive. These methods normally require preconcentration. Liquid chromatography (LC) electrospray ionization mass spectrometry (ESI-MS) and LC combined with inductively coupled plasma mass spectrometry (ICPMS), and Mass spectrometry in tandem with liquid chromatography and FTIR have been used to determine MeHg. These high-cost instruments also require trained technicians to operate them properly. These instruments also require regular maintenance and costly supplies.

Accordingly, there is a need for new systems, devices and schemes to allow reliable and accurate measurements and recovery of heavy metals such as MeHg that is effective, easy to regenerate, low cost and easy to operate.

BRIEF SUMMARY

The present technology provides methods and devices for the detection and capture of methylmercury and other suitable heavy metals. This technology also pertains to water decontamination and recovery, and more particularly describes a novel platform that can detect and/or remove harmful MeHg molecules in groundwater for water restoration.

The conventional Methyl-Hg detection instrument, ICP-MS, is expensive to use and relies on a time consuming and labor-intensive process to acquire a Methyl-Hg concentrated species. Chemical amplification of the binding events between methyl mercury and thiol through acid promoted deprotection of the methods reduces the detection limits without the need of expensive bulky instruments.

In one embodiment, a method for removing mercury from an aqueous solution is provided that is based on a platform with a substrate with a polymer layer with a plurality of thiol functionalized methyl groups and a plurality of phenol moieties protected by tetrahydropyran (THP) or ethyl vinyl ether (EVE). Mercury binds to the thiols thereby releasing a proton to the solution and cleaving the tetrahydropyran (THP) or ethyl vinyl ether (EVE) protectors/caps from the phenol moieties and detecting the presence of cleaved caps to indicate mercury binding.

The detecting and separating platform is preferably fabricated by providing a substrate with a top surface and forming a polymer layer on the top surface of the substrate that has a number of exposed phenol moieties. The phenol moieties are protected with a cap of preferably a tetrahydropyran (THP) or ethyl vinyl ether (EVE) cap. Thiol groups are installed on polymer methyl groups to complete a functionalized polymer platform.

According to one aspect of the technology, a system is provided with an amplification mechanism where a thiol or sulfide is used to capture methyl-Hg forming $S—CH_3Hg^+$ and releasing an acid, H+. The released acid will subsequently catalyze a deprotection reaction, which regenerates another acid. Therefore, one capture event can result in a cascade of deprotonation reactions. Deprotonated polymers can be selectively removed by a particular solvent. These two amplifications of methyl-Hg capture event can significantly enhance the detection limit.

Another aspect of the technology is to provide a MeHg detection apparatus that is approach is portable, simple to use, fast and has significantly enhanced detection capabilities over existing devices. Cascade amplification of the $S—CH_3Hg^+$ formation will address inadequate detection limit by conventional detection methods.

Another aspect of the technology is to provide a handheld detection device for detecting Hg and Methyl-Hg in aqueous media that is easy to use and reliable.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, systems and methods for detecting and sequestering harmful MeHg molecules are generally shown. Several embodiments of the technology are described generally in FIG. 1A to FIG. 5 to illustrate the characteristics and functionality of the devices, systems, and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

A time consuming and labor-intensive process is required to acquire a Methyl-Hg concentrated species using conventional Methyl-Hg detection instruments such as ICP-MS, a process that is also expensive. To avoid these drawbacks, the approach of the present technology is simple, fast and can significantly enhance detection capability. The present invention is a low-cost portable device that overcomes the inadequate detection limits of conventional detection methods using cascade amplification of the $S—CH_3Hg^+$ formation. The apparatus and approach may also provide Methyl-Hg capture and/or detection that provides dual functionalities.

The apparatus can also be used for rapid and accurate detection of Hg in natural samples, specifically watershed samples suspected of being contaminated with mercury. Accordingly, an aspect of this technology is to create a new platform that can absorb or detect harmful ions in groundwater for water restoration.

Figures 1A, 1B:
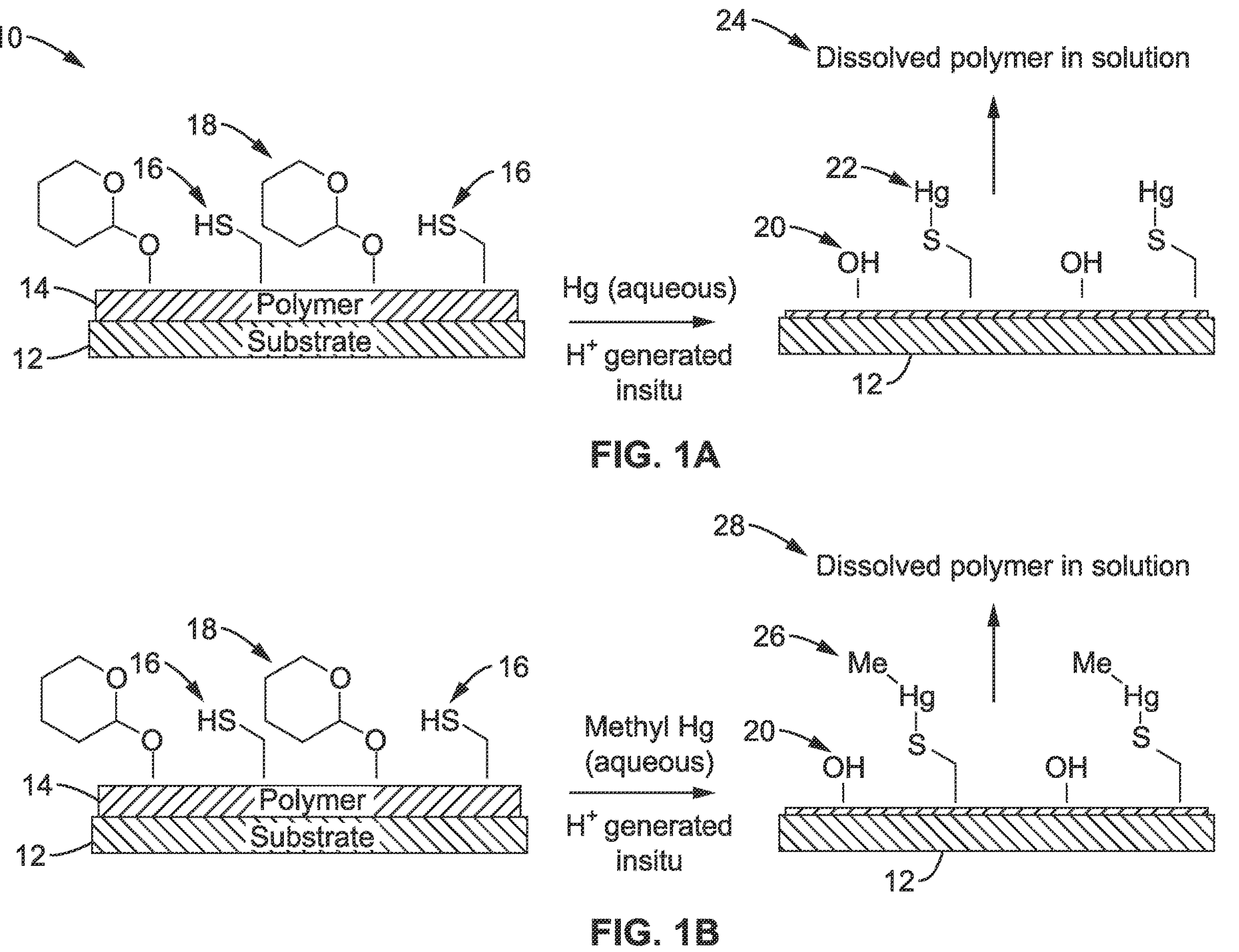
FIG. 1A: is a schematic cross-sectional view of a polymer-based detection device for mercury detection or sequestration according to an embodiment of the presented technology.
FIG. 1B: is a schematic cross-sectional view of a polymer-based detection device for mercury or methyl mercury detection or sequestration according to another embodiment of the presented technology.

Turning now to FIG. 1A and FIG. 1B, the general structure of one separation apparatus and system 10 for capturing and detecting Hg and MeHg contaminants are shown schematically. The apparatus of system 10 has a detection platform with a substrate 12 that has a polymer overlay 14 as shown in FIG. 1A for Hg detection and FIG. 1B for MeHg detection. In one embodiment, a polymer layer was applied to both sides of a planar substrate.

As seen in FIG. 1A and FIG. 1B, the polymer overlay 14 on the substrate 12 has a top surface of the polymer has many active sites such as sulfide or thiol moieties 16 and a protected phenol 18 moieties. In FIG. 1A, the thiol moieties of the polymer surface are available to react with Hg ions in an aqueous solution containing Hg+ ions with an increase in protons generated in situ. The protected moieties are converted to alcohol moieties 20 after the protective cap is removed and the thiol or sulfide moieties bind to the Hg metal ions 22 and release a proton.

Similarly, as shown in FIG. 1B, the platform polymer layer 14 has available sulfide or thiol moieties 16 surface groups that are free to bond 26 with MeHg molecules within an aqueous sample. Protons that are preferably generated in situ, facilitated by the bonding of the MeHg with the polymer groups 26 and the release of polymer 28 in solution.

Since the substrates shown in FIG. 1A and FIG. 1B are reactions that are not reversible, the substrates cannot be reused for detection. However, it will be seen that this feature can be utilized in the sequestration of Hg or MeHg with polymer coated panels or plates or other reactive members within purification devices. Detection of dissolved polymer or cleaved caps may be used as an indication of the bonding of the mercury with the thiol moieties.

Figure 2:
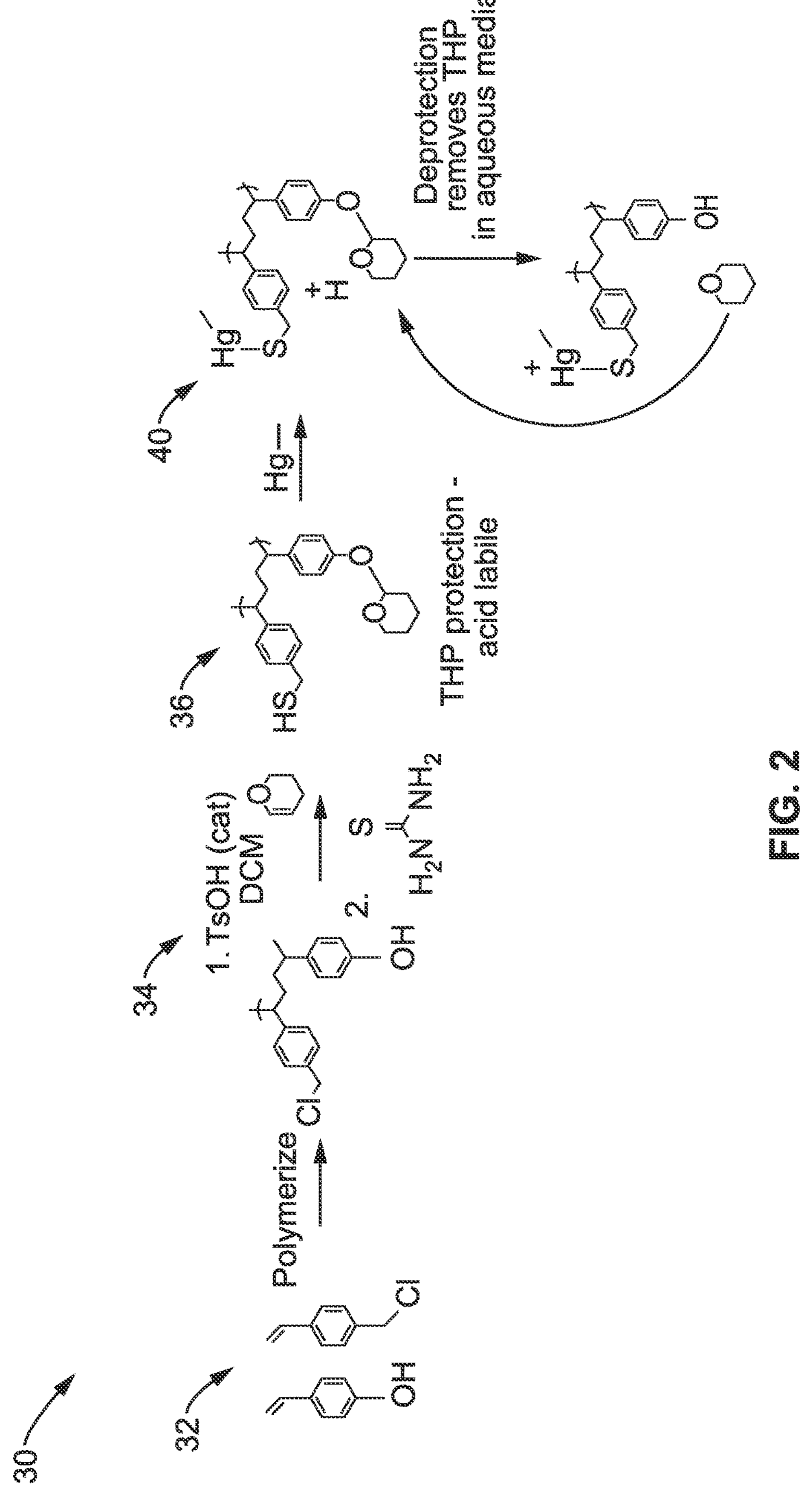
FIG. 2: Schematic process flow to form a THPE capped polymer and of the detection of Hg or Methyl-Hg in an aqueous solution according to one embodiment of the technology.
Figure 3:
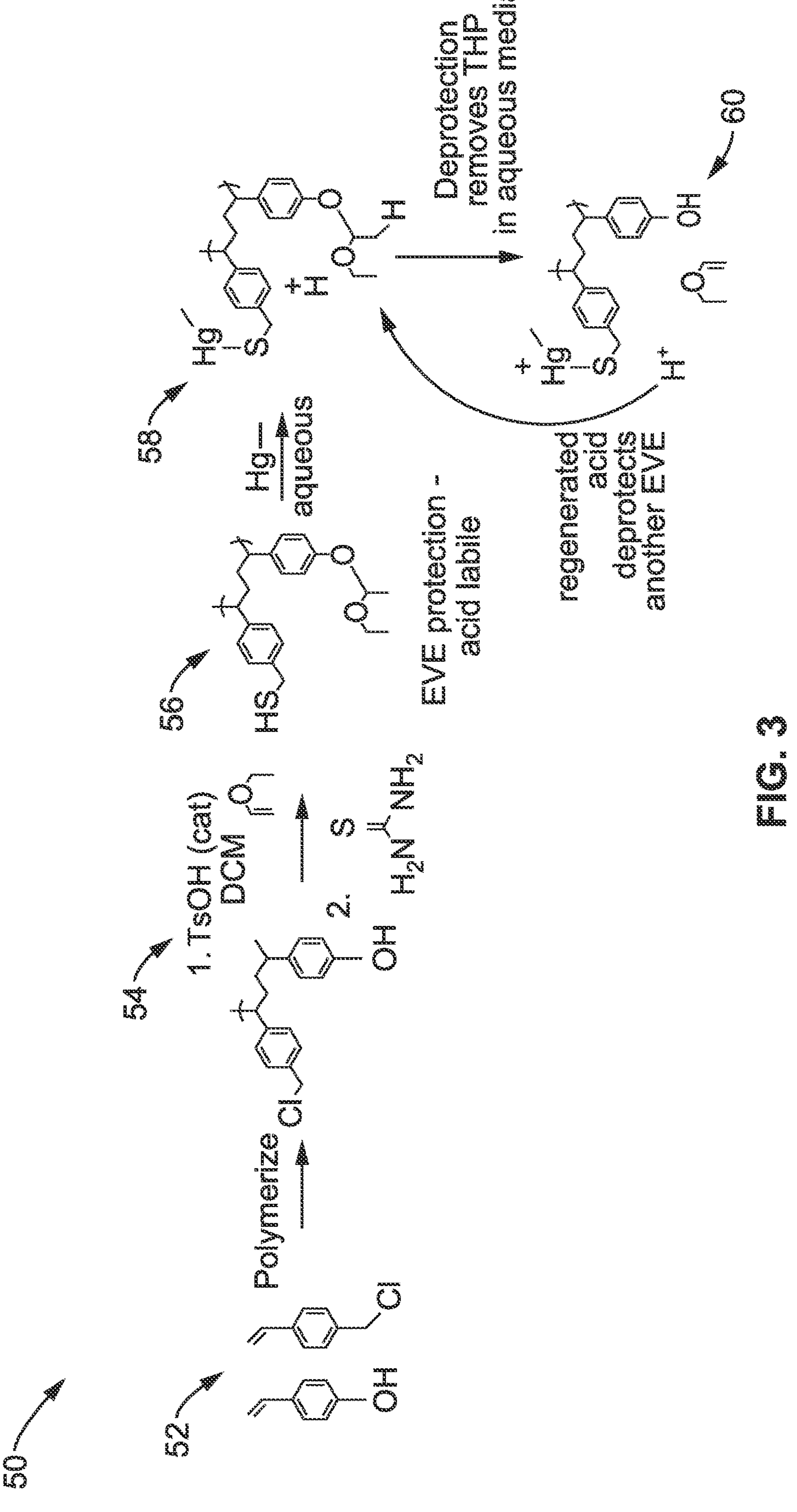
FIG. 3: Schematic process flow to form an EVE capped polymer and of the detection of Hg or Methyl-Hg in an aqueous solution according to an alternative embodiment of the technology.

Referring also to FIG. 2 and FIG. 3, the detection and sequestration methods described herein generally rely on two amplification processes. In the first amplification process, (a) thiol or sulfide are used to capture Methyl-Hg, forming S—$CH_3Hg^+$ and releasing an acid, H+. The MeHg ion ($CH_3Hg^+$) has a strong affinity for soft base ligands, especially inorganic and organic reduced sulfur compounds (sulfide and thiols, respectively). Then, (b) the released acid will subsequently catalyze a deprotection reaction, which regenerates another acid as shown in FIG. 2 and FIG. 3. Therefore one capture event can result in a cascade of deprotonation reactions.

In the second amplification, deprotected polymers like poly(hydroxy styrene), can be selectively removed by a particular solvent. These two amplifications of the methyl-Hg capture event can significantly enhance the detection limit over existing approaches.

In one embodiment, a polymer film is provided that contains two functional groups in one or two repeat units: (a) thiol is used to capture Methyl-Hg+, forming S—$CH_3Hg^+$ and releasing an acid, $H^+$. Then, (b) the released acid will subsequently catalyze deprotection of a tetrahydropyranyl ether (THPE) protected phenol, for example, which releases another H+. Therefore, as long as H+ is present, one capture event can result in a cascade of deprotection reactions, representing the first amplification.

It can be seen that the deprotection reaction (e.g. the removal of tetrahydropyran group) changes the chemistry of the polymer to become soluble in a specific chosen solvent. This means that capturing more Methyl-Hg+ ions lead to more subsequent deprotection events, resulting in a higher solubility of the polymer. Substantial weight loss is another available amplification.

Turning now to FIG. 2, an embodiment of a polymer-based device 30 for mercury detection is shown schematically. In this embodiment, a 1:1 mixture 32 of 4-hydroxystyrene and 4-chloromethylstyrene are dissolved in a solution of toluene and polymerized using catalytic azobisisobutyronitrile (AIBN) (5 mol %). Once a pure polymer 34 is achieved, protection of the phenol moiety 36 with tetrahydropyran (THP) can be achieved in an aprotic solvent using catalytic toluene sulfonic acid (TsOH) and dihydropyran, for example. Many other options exist for the installation of THPE are known in the art, however.

After successful protection of the phenol 34, installation of a thiol group in the place of the chloromethyl may be achieved using thiourea. The resulting polymer 40 will release a portion of $H^+$ upon the binding of mercury or methylmercury to the pendant thiol, and in aqueous media the THP group will be cleaved off and produce an acid.

The regenerated acid 42 will release another portion of acid and continue the cascade of deprotection. The polymer may be deposited onto a substrate such as a $SiO_2$ wafer as shown in FIG. 1A or FIG. 1B. Upon exposure to mercury the pendant thiol will irreversibly bind and release a proton, making the solution acidic leading to deprotection of the acetal (THPE in this case). Protic conditions are necessary for the deprotection rendering aqueous solutions an ideal media.

Similarly, an embodiment 50 showing synthesis of the THPE polymer for detection of methyl-Hg in aqueous solutions is shown schematically in FIG. 3. Polymerization is achieved using a mixture 52 of 4-hydroxystyrene and 4-chloromethylstyrene dissolved in a solution of toluene and polymerized using catalytic azobisisobutyronitrile (AIBN) (5 mol %) in this embodiment. The phenol groups 56 of the produced pure polymer 54 may be protected with tetrahydropyran (THP). THPE is one of the most acid labile of the phenol protecting groups and thus it is the ideal candidate for use in this polymer and should deprotect at room temperature.

However, other acetals are options for acid labile protecting groups may be used in the place of THPE. For example, one alternative ethyl vinyl ether (EVE) is illustrated in FIG. 3. Synthesis of the EVE polymer for detection of Hg or Methyl-Hg in aqueous solutions is shown schematically in FIG. 3. Upon exposure to Methyl-mercury the pendant thiol 58 of the polymer 60 will irreversibly bind and release a proton, making the solution acidic leading to deprotection of the acetal (EVE in this case).

Accordingly, the platform and apparatus are mechanically robust structures that are stable and reusable with sufficient mechanical integrity. The functionalized surfaces enable high selectivity, and the absorbers are covalently anchored to the platform. The platforms can be sized and scaled to provide abundant sites to seize mercury metal ions effectively.

Figure 4:
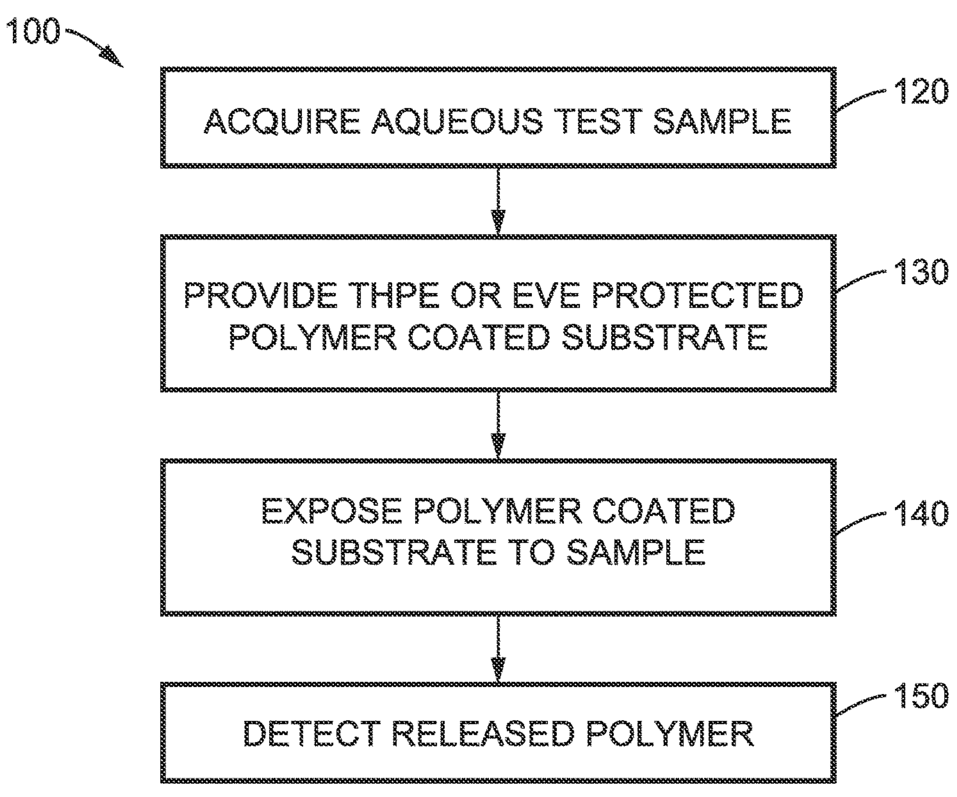
FIG. 4 is a schematic process diagram of a method for detecting Hg or Methyl-Hg in an aqueous solution according to the technology.
Figure 5:
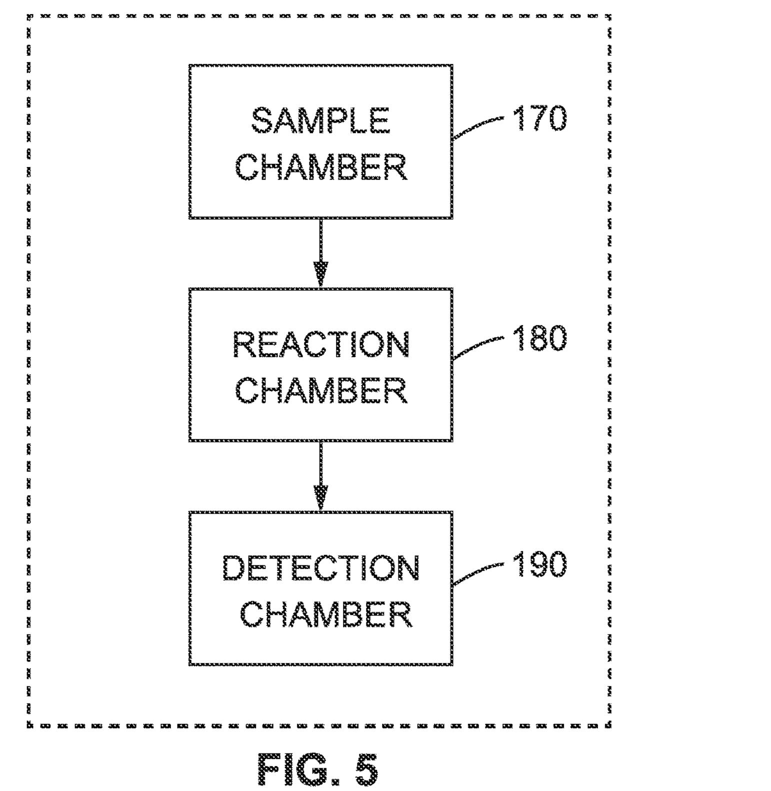
FIG. 5 is a schematic top view of a chambered cartridge for a polymer-based detection device for mercury or methyl mercury detection or sequestration according to one implementation of the technology.

As seen in the schematic flow diagram of FIG. 4, the method 100 for detecting Hg or MeHg begins with acquiring an aqueous test sample at block 120. It will be appreciated that samples acquired at block 120 may come from a variety of sources. For example, site restoration of soil and underground water, food sources, remediation of mercury and industrial contaminants and research and development leading to the control of the flux of contaminants in soil and water environments.

A preferably THPE or EVE protected polymer coated substrate that has the general structure shown in FIG. 1A or FIG. 1B is provided at block 130. This step at block 130 is illustrated in FIG. 2 and FIG. 3, respectively.

The protected polymer coated substrate of block 130 is exposed to the fluid sample for a period of time at block 140. This allows for Hg or MeHg binding, deprotection and acid regeneration for further deprotection as described generally in FIG. 2 and FIG. 3.

The solution is then evaluated to detect the presence of released polymer at block 150. Released polymer can be quantified and the spent platforms replaced at block 150. In one embodiment, the presence of polymer in solution is used as an indicator of the presence of Hg or MeHg in the sample.

It can be seen that the mercury ion detection methods described here can be incorporated into simple handheld detection devices. In one embodiment, the processing is contained in a fluidic cartridge. As shown schematically in FIG. 5, the cartridge 160 has a sample intake chamber 170. The polymer sensor substrate may be inserted into 170 and then moves to the reaction chamber 180 and the detection chamber 190. After a period of time/temperature at a setting to allow the deprotection to take place, the presence of polymer (such as THP) can be detected and quantified by a sensor in an associated device that is configured to receive the cartridge and process the sample.

The system 10 and platform are preferably incorporated into a handheld device that will be made to detect mercury or methylmercury in concentrations of about ng/mL with high sensitivity and resolution. However, the system 10 can also be configured for table-top detection of samples or inline fluid detections. In another embodiment, a micro-quartz balance is integrated into the device to offer further enhanced resolution (0.1 ng).

From the description herein, it will be appreciated that that the present disclosure encompasses multiple embodiments which include, but are not limited to, the following:

A mercury or methyl-mercury capture material, comprising: (a) a polymer surface with exposed thiol or sulfide moieties and phenol moieties, the phenol moieties capped with an acid labile acetal group; (b) wherein binding of Hg or MeHg with a thiol group releases a proton; (c) wherein the released proton is configured to catalyze separation of the acid labile acetal group from the phenol moieties and releasing a second proton; and (d) wherein separation of the cap changes polymer solubility.

The capture material of any preceding or following implementation, further comprising a substrate.

The capture material of any preceding or following implementation, wherein the substrate comprises a $SiO_2$ wafer.

The capture material of any preceding or following implementation, wherein the polymer is formed from a 1:1 mixture of 4-hydroxystyrene and 4-chloromethylstyrene dissolved in a solution of toluene and polymerized using catalytic AIBN (5 mol %).

The capture material of any preceding or following implementation, wherein the acid labile protecting cap is selected from the group consisting of tetrahydropyran (THP) and ethyl vinyl ether (EVE).

A method for fabricating a mercury capture material, the method comprising: (a) providing a substrate with a top surface; (b) forming a polymer layer on the top surface of the substrate, the polymer with a plurality of exposed phenol moieties and exposed methyl groups; (c) protecting the plurality of phenol moieties of the polymer layer with an acid labile acetal group cap; (d) installing thiol groups on polymer methyl groups to complete a functionalized polymer platform.

The method of any preceding or following implementation, wherein the substrate comprises a $SiO_2$ wafer.

The method of any preceding or following implementation, further comprising forming a polymer layer on a bottom surface of the substrate.

The method of any preceding or following implementation, wherein the polymer is formed with a 1:1 mixture of 4-hydroxystyrene and 4-chloromethylstyrene dissolved in a solution of toluene and polymerized using catalytic AIBN (5 mol %).

The method of any preceding or following implementation, wherein the acid labile protecting cap is selected from the group consisting of tetrahydropyran (THP) and ethyl vinyl ether (EVE).

The method of any preceding or following implementation, wherein the protection of the phenol moiety with tetrahydropyran (THP) comprises mixing catalytic toluene sulfonic acid (TsOH) and dihydropyran in an aprotic solvent.

The method of any preceding or following implementation, wherein the installation of a thiol group comprises substituting a thiol group for a polymer chloromethyl group with thiourea.

A method for removing Hg or MeHg from an aqueous solution, the method comprising: (a) acquiring an aqueous solution; (b) providing sensor platform of a polymer with a plurality of thiol groups and a plurality of phenol moieties protected by acid labile caps; (c) exposing the polymer to the aqueous solution; and (d) binding Hg or MeHg present in the aqueous solution to the thiol groups thereby removing the Hg or MeHg from the solution.

The method of any preceding or following implementation, wherein the sensor platform further comprises a substrate supporting a layer of polymer.

The method of any preceding or following implementation, wherein the acid labile protecting cap is selected from the group consisting of tetrahydropyran (THP) and ethyl vinyl ether (EVE).

The method of any preceding or following implementation, further comprising: binding Hg or MeHg from the aqueous solution to the thiol groups thereby releasing a proton to solution; cleaving the tetrahydropyran (THP) or ethyl vinyl ether (EVE) caps from the phenol moieties from release of the protons from thiol binding, the cleaving releasing a proton; and detecting the presence of cleaved caps to indicate Hg or MeHg binding.

A system for detecting Hg or MeHg from an aqueous solution, the system comprising: (a) a sample chamber configured to hold an aqueous sample for testing; (b) a reaction chamber fluidly coupled to the sample chamber, the reaction chamber having an interior containing a sensor platform of a polymer with a plurality of thiol groups and a plurality of phenol moieties protected by acid labile caps; and (c) a detection chamber fluidly coupled to the reaction chamber, the detection chamber configured to detect the presence of polymer in solution.

The system of any preceding or following implementation, wherein the sensor polymer comprises a support substrate with a top surface supporting a layer of the polymer.

The system of any preceding or following implementation, wherein the acid labile protecting cap is selected from the group consisting of tetrahydropyran (THP) and ethyl vinyl ether (EVE).

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C," within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment," "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A mercury or methyl-mercury capture material, comprising:

(a) a polymer surface with exposed thiol or sulfide moieties and phenol moieties, said phenol moieties capped with an acid labile acetal group;

(b) wherein binding of Hg or MeHg with a thiol group releases a proton;

(c) wherein said released proton is configured to catalyze separation of the acid labile acetal group from the phenol moieties and releasing a second proton; and (d) wherein separation of the cap changes polymer solubility.

2. The capture material of claim 1, further comprising a substrate.

3. The capture material of claim 2, wherein said substrate comprises a $SiO_2$ wafer.

4. The capture material of claim 1, wherein said polymer is formed from a 1:1 mixture of 4-hydroxystyrene and 4-chloromethylstyrene dissolved in a solution of toluene and polymerized using catalytic 5 mol % AIBN.

5. The capture material of claim 1, wherein the acid labile acetal group is selected from the group consisting of tetrahydropyran (THP) and ethyl vinyl ether (EVE).

6. A mercury or methyl-mercury capture material, comprising:

(a) a substrate;

(b) a polymer surface disposed on the substrate, said polymer surface with exposed thiol or sulfide moieties and phenol moieties, said phenol moieties capped with an acid labile acetal group selected from the group consisting of tetrahydropyran (THP) and ethyl vinyl ether (EVE);

(c) wherein binding of Hg or MeHg with a thiol group releases a proton;

(d) wherein said released proton is configured to catalyze separation of the acid labile acetal group from the phenol moieties and releasing a second proton; and (e) wherein separation of the cap changes polymer solubility.

7. The capture material of claim 6, wherein said substrate comprises a $SiO_2$ wafer.

8. The capture material of claim 6, wherein said polymer is formed from a 1:1 mixture of 4-hydroxystyrene and 4-chloromethylstyrene dissolved in a solution of toluene and polymerized using catalytic 5 mol % AIBN.

9. A mercury or methyl-mercury capture material, comprising:

(a) an $SiO_2$ wafer substrate;

(b) a polymer surface disposed on the substrate, said polymer surface with exposed thiol or sulfide moieties and phenol moieties, said phenol moieties capped with tetrahydropyran (THP) or ethyl vinyl ether (EVE);

(c) wherein binding of Hg or MeHg with a thiol group releases a proton;

(d) wherein said released proton is configured to catalyze separation of the acid labile acetal group from the phenol moieties and releasing a second proton; and (e) wherein separation of the cap changes polymer solubility.

10. The capture material of claim 9, wherein said polymer is formed from a 1:1 mixture of 4-hydroxystyrene and 4-chloromethylstyrene dissolved in a solution of toluene and polymerized using catalytic 5 mol % AIBN.

* * * * *